(12) United States Patent
Yano et al.

(10) Patent No.: US 7,078,914 B2
(45) Date of Patent: Jul. 18, 2006

(54) PARALLEL MONITOR CIRCUIT AND SEMICONDUCTOR APPARATUS

(75) Inventors: Koichi Yano, Kanagawa (JP); Akihiko Fujiwara, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/091,420

(22) Filed: Mar. 29, 2005

(65) Prior Publication Data

US 2005/0285565 A1 Dec. 29, 2005

(30) Foreign Application Priority Data

Mar. 30, 2004 (JP) ............................. 2004-098755

(51) Int. Cl.
*H02J 7/00* (2006.01)
*G01R 27/26* (2006.01)

(52) U.S. Cl. ..................... 324/658; 324/434; 320/166

(58) Field of Classification Search ................ 324/658, 324/434; 320/164, 166
See application file for complete search history.

(56) References Cited

U.S. PATENT DOCUMENTS 5,532,572 A * 7/1996 Okamura .................... 320/166
5,960,898 A * 10/1999 Okada et al. ............... 180/65.8
6,265,851 B1   7/2001 Brien et al. .................. 320/162
6,295,002 B1 * 9/2001 Fukuda ..................... 340/636.1
6,316,917 B1 * 11/2001 Ohta .......................... 320/166
6,323,623 B1 * 11/2001 Someya et al. ............. 320/166

FOREIGN PATENT DOCUMENTS

| EP | 1 122 852 A2 | 8/2001 |
| EP | 1122852 A2 * | 8/2001 |
| JP | 3313647 | 5/2002 |
| WO | WO 02/061914 A2 | 8/2002 |
| WO | WO 02/097945 A2 | 12/2002 |

* cited by examiner

*Primary Examiner*—Anjan Deb
(74) *Attorney, Agent, or Firm*—Oblon, Spivak, McClelland, Maier & Neustadt, P.C.

(57) ABSTRACT

A parallel monitor circuit (1A) for monitoring one (C1) of serially connected plural capacitors (Cn) receiving a direct recharging current is disclosed. The circuit comprises a bypassing transistor (Q1) for bypassing the capacitor (C1) with the recharging current when the capacitor voltage (VSo1) exceeds a monitor voltage (Vr1) determined by a voltage setting circuit in order to equally recharge the capacitors. A transferring unit transfers a voltage control circuit (VS1) and an internal circuit connected to the voltage control circuit to a standby mode when the voltage control circuit receives a specific combination of voltage codes (RC1).

7 Claims, 6 Drawing Sheets

FIG.5

| No. | RC1a | RC1b | RC1c | RC1d | OUT1 | OUT2 | OUT3 | ... | OUT14 | OUT15 | OUT16 |
|---|---|---|---|---|---|---|---|---|---|---|---|
| 1 | 0 | 0 | 0 | 0 | 1 | 0 | 0 | ... | 0 | 0 | 0 |
| 2 | 1 | 0 | 0 | 0 | 0 | 1 | 0 | ... | 0 | 0 | 0 |
| 3 | 0 | 1 | 0 | 0 | 0 | 0 | 1 | ... | 0 | 0 | 0 |
| 4 | 1 | 1 | 0 | 0 | 0 | 0 | 0 | ... | 0 | 0 | 0 |
| 5 | 0 | 0 | 1 | 0 | 0 | 0 | 0 | ... | 0 | 0 | 0 |
| 6 | 1 | 0 | 1 | 0 | 0 | 0 | 0 | ... | 0 | 0 | 0 |
| 7 | 0 | 1 | 1 | 0 | 0 | 0 | 0 | ... | 0 | 0 | 0 |
| 8 | 1 | 1 | 0 | 0 | 0 | 0 | 0 | ... | 0 | 0 | 0 |
| 9 | 0 | 0 | 0 | 1 | 0 | 0 | 0 | ... | 0 | 0 | 0 |
| 10 | 1 | 1 | 0 | 1 | 0 | 0 | 0 | ... | 0 | 0 | 0 |
| 11 | 0 | 1 | 0 | 1 | 0 | 0 | 0 | ... | 0 | 0 | 0 |
| 12 | 1 | 0 | 1 | 1 | 0 | 0 | 0 | ... | 0 | 0 | 0 |
| 13 | 0 | 0 | 1 | 1 | 0 | 0 | 0 | ... | 1 | 0 | 0 |
| 14 | 1 | 1 | 1 | 1 | 0 | 0 | 0 | ... | 0 | 0 | 0 |
| 15 | 0 | 0 | 1 | 1 | 0 | 0 | 0 | ... | 0 | 1 | 0 |
| 16 | 1 | 1 | 1 | 1 | 0 | 0 | 0 | ... | 0 | 0 | 1 |

PARALLEL MONITOR CIRCUIT AND SEMICONDUCTOR APPARATUS

BACKGROUND OF THE INVENTION

1. Field of the Invention

The present invention generally relates to a parallel monitor circuit and a semiconductor apparatus having such a parallel monitor circuit for monitoring one of serially connected electric double layer capacitors in order to equally recharge the capacitors, and specifically relates to such a parallel monitor circuit in which a monitor voltage for shifting the circuit to a standby mode can be varied.

2. Description of the Related Art

An electric double layer capacitor can be quickly recharged, compared with a secondary battery requiring a lot of time for recharging. Besides, the electric double capacitor has an advantage not attained by the secondary battery, in that it can store a great amount of energy. However, the electric double layer capacitor has a low rated voltage of 2.7 V, and therefore usually plural capacitors are serially connected to get a necessary high voltage.

Thus serially connected plural capacitors have a problem that recharging is not uniform or equal for each capacitor due to capacitance variation, self recharging, self discharging, etc.

In order to deal with the unequal recharging problem, a recharge equalizing circuit called "a parallel monitor circuit" is normally used.

FIG. 4 is a circuit diagram of a part of such a parallel monitor circuit disclosed in Japanese Patent No. 3,313,647.

Although FIG. 4 only shows one parallel monitor circuit, a plurality of serially connected parallel monitor circuits are usually employed. Each of the parallel monitor circuits is connected to one capacitor. The parallel monitor circuits have the same structure, therefore an explanation is given below with respect to only one parallel monitor circuit.

As shown in FIG. 4, the parallel monitor circuit comprises two reference voltage supplies Vr1 and Vr2, a comparator circuit CMP for comparing these reference voltages to a voltage of a capacitor C1, two switches S1 and S2 for switching connection to the reference voltages Vr1 and Vr2, a transistor Tr1 for bypassing the capacitor C1 with an electric current for recharging the capacitor C1, and a switch control circuit.

The reference voltage Vr1 is set at 3 V that is the same as the full recharge voltage for the capacitor C1. The reference voltage Vr2 is set at 0.8 V lower than the full recharge voltage. At the initial stage of recharging process, the switch S1 is connected to the reference voltage Vr2 (0.8 V). When the voltage of the capacitor C1 reaches 0.8 V, the output of the comparator circuit CMP is reversed to H, turning on the transistor Tr1. After the transistor Tr1 is turned on, the capacitor C1 is discharged with a time constant that is determined by resistance factors including the transistor Tr1.

The switching control circuit monitors the outputs of all the comparator circuits CMP. While the capacitor C1 is being discharged, if any other capacitor Cn reaches 0.8 V, the switching control circuit switches switch S1 to the reference voltage Vr1 to release the bypassing mode for the capacitor C1 and recharge the capacitor C1 up to the full recharge voltage 3 V.

In such conventional parallel monitor circuits, electric power is always supplied to the comparator circuit CMP even while the recharge control is not performed, resulting in wasteful power consumption, which is a problem.

In general, a standby mode is known for saving power to solve the above problem. In such a standby mode, while circuits included in a semiconductor apparatus are not required to operate, the circuit operation is stopped and supplied power becomes lower. However, in order to shift or transfer the semiconductor apparatus to the standby mode, it is necessary for the semiconductor apparatus to have a standby terminal, through which an external control circuit including a CPU supplies a standby signal to the semiconductor apparatus.

However, since the parallel monitor circuits receive control signals from the external control circuit for controlling the recharge of many capacitors connected thereto, they need many terminals. The number of terminals is very important when a semiconductor apparatus including such parallel monitor circuits is encapsulated in a general purpose package.

In more detail, in order to control step by step from the lowest IC to the highest IC among the serially connected semiconductor apparatus, two terminals are needed for one signal. When a plurality of status controls is necessary, two terminals for ON/OFF of one state bring high manufacturing costs, complex circuit layouts and a large area for the wiring board.

If the number of necessary terminals is more than the number of terminals of a general purpose package just by one, a larger and more expensive package must be utilized.

SUMMARY OF THE INVENTION

Accordingly, it is a general object of the present invention to provide a parallel monitor circuit and a semiconductor apparatus employing the parallel monitor circuit, in which no dedicated terminal is needed for shifting or transferring the parallel monitor circuit to a standby mode.

Features and advantages of the present invention are set forth in the description that follows, and in part will become apparent from the description and the accompanying drawings, or may be learned by practice of the invention according to the teachings provided in the description. Objects as well as other features and advantages of the present invention will be realized and attained by a parallel monitor circuit particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides as follows.

According to one feature of the present invention, there is provided a parallel monitor circuit for monitoring one of serially connected plural capacitors receiving a direct recharging current, comprising a bypassing transistor for bypassing the capacitor with the recharging current when a capacitor voltage exceeds a monitor voltage determined by a voltage setting circuit in order to equally recharge the capacitors, characterized by a transferring unit for transferring a voltage control circuit and an internal circuit connected to the voltage control circuit to a standby mode when the voltage control circuit receives a specific combination of voltage codes.

In the parallel monitor circuit, a standby signal may be output when all the bits of the voltage codes are high.

In the parallel monitor circuit, a negative voltage may be detected and abnormal operation may be detected after the internal circuit has been transferred to the standby mode and voltage detection has been stopped.

In the parallel monitor circuit, the voltage codes input to the voltage control circuit may be merged with status control signals requiring no voltage setting code, using control terminals for connecting plural semiconductor apparatuses, without adding a dedicated terminal.

In the parallel monitor circuit, signal lines may be merged using control terminals for connecting plural semiconductor apparatuses, without adding a dedicated terminal.

There is also provided a semiconductor apparatus having the above mentioned parallel monitor circuits.

BRIEF DESCRIPTION OF THE DRAWINGS

FIG. 5 is a table showing relationships between code signals RC1a~RC1d input to a decoder 13 and output signals OUT1~OUT16 of the decoder 13;

DESCRIPTION OF THE PREFERRED EMBODIMENTS

In the following, embodiments of the present invention are described with reference to the accompanying drawings.

Figure 1:
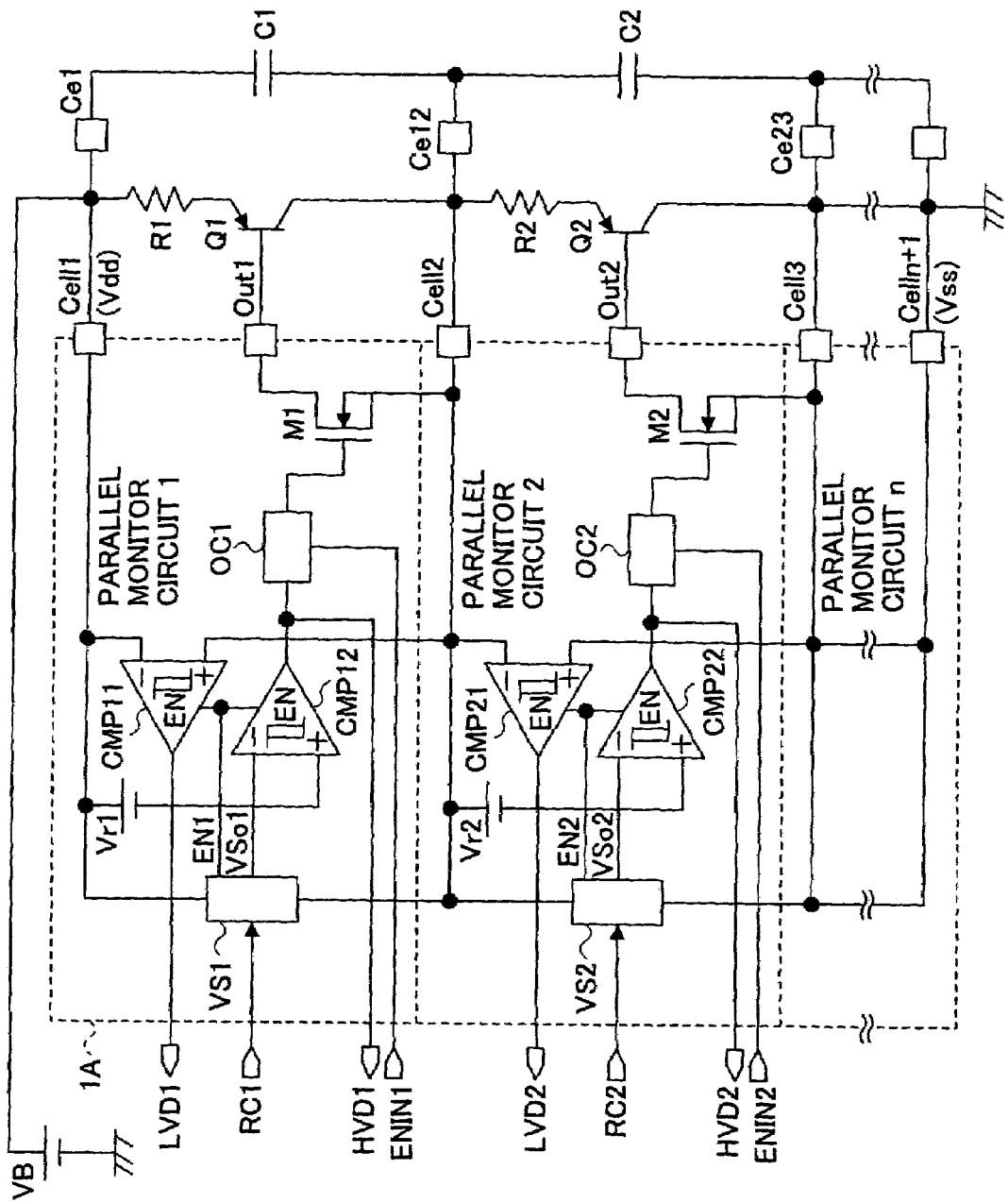
FIG. 1 is a circuit diagram illustrating parallel monitor circuits and a semiconductor apparatus employing the parallel monitor circuits according to an embodiment of the present invention.

FIG. 1 is a circuit diagram illustrating parallel monitor circuits and a semiconductor apparatus employing the parallel monitor circuits according to an embodiment of the present invention.

A semiconductor apparatus 1A includes n (n is an integer) parallel monitor circuits that are shown surrounded by a dotted line. A terminal Vdd and a terminal Vss are connected to a power supply VB and ground, respectively. Between a terminal $Cell_n$ and a terminal $Cell_{n+1}$ of each parallel monitor circuit n, a capacitor Cn and a bypass transistor Qn having an emitter connected to a resistance Rn are connected. A base of the bypass transistor Qn is connected via a terminal Outn to a drain of a bypass drive transistor Mn.

Since all parallel monitor circuits 1~n included in the semiconductor apparatus 1A have the same structure, only one parallel monitor circuit 1 is representatively explained below. The parallel monitor circuit 1 comprises a voltage setting circuit VS1, a reference voltage Vr1, two comparator circuits CMP11 and CMP12, an output control circuit OC1, and a bypass drive transistor M1.

The voltage setting circuit VS1 generates a voltage proportional to a voltage of the capacitor C1. A proportion constant is set by a code signal RC1 that is sent from an external control circuit (not shown).

The code signal RC1 is a 4 bit digital signal, and can designate any of 15 monitor voltages from an initialization level to a full recharge level depending on combinations of the bit codes.

The comparator circuit CMP12 has hysteresis characteristics in its input circuit, and compares the reference voltage Vr1 with a voltage VSo1 output from the voltage setting circuit VS1. When the output voltage VSo1 exceeds the reference voltage Vr1, the comparator circuit CMP12 reverses its output to a high level.

Two inputs of the comparator circuit CMP11 are connected to corresponding sides of the capacitor C1. The comparator circuit CMP11 is a comparing circuit for detecting that the capacitor C1 is recharged to a negative voltage. The detection of the negative voltage of the capacitor C1 is realized by having hysteresis characteristics in its input terminal. When a voltage of the capacitor C1 becomes −0.2 V, the comparator circuit CMP11 outputs a high level signal. This signal is sent as a low voltage detection signal LVD1 to the control circuit. Upon receiving the low voltage detection signal LVD1, the control circuit stops the discharge of the capacitor C1.

The comparator circuit CMP11 is a protection circuit that detects the over-discharge of the capacitor C1, and prevents the electric double layer capacitor C1 from receiving a reverse voltage.

The output control circuit OC1 is controlled by an output enable signal ENIN1 that is sent from the control circuit. When the ENIN1 is active, the output control circuit OC1 connects the output of the comparator circuit CMP12 to a gate of the bypass drive transistor M1.

When the voltage of the capacitor C1 gradually goes high and the output voltage VSo1 of the voltage setting circuit VS1 exceeds the reference voltage Vr1, the comparator circuit CMP12 reverses and outputs a high level signal. This signal is sent as a high voltage detection signal HVD1 to the control circuit. Upon receiving the high voltage detection signal HVD1, the control circuit performs a predetermined process and sends the output enable signal ENIN1 to the parallel monitor circuit to make the output control circuit OC1 active. When the output control circuit OC1 turns active, the output of the comparator CMP12 is connected to the gate of the bypass drive transistor M1 to turn the bypass drive transistor M1 on and turn the bypass drive transistor Q1 on. When the bypass transistor Q1 turns on, an electric current for recharging the capacitor C1 flows through the resistance R1 and the bypass transistor Q1, bypassing the capacitor C1.

When the control circuit determines that one of the capacitors connected to one of the parallel monitor circuits is fully recharged, it sends a specific code signal RC1 to the one of the parallel monitor circuits 1. Upon receiving the specific code signal RC1, the voltage setting circuit VS1 sends a signal EN1 and changes the comparator circuits CMP11 and CMP12 to standby status, and reduces its own consumption of current as explained below.

Figure 2:
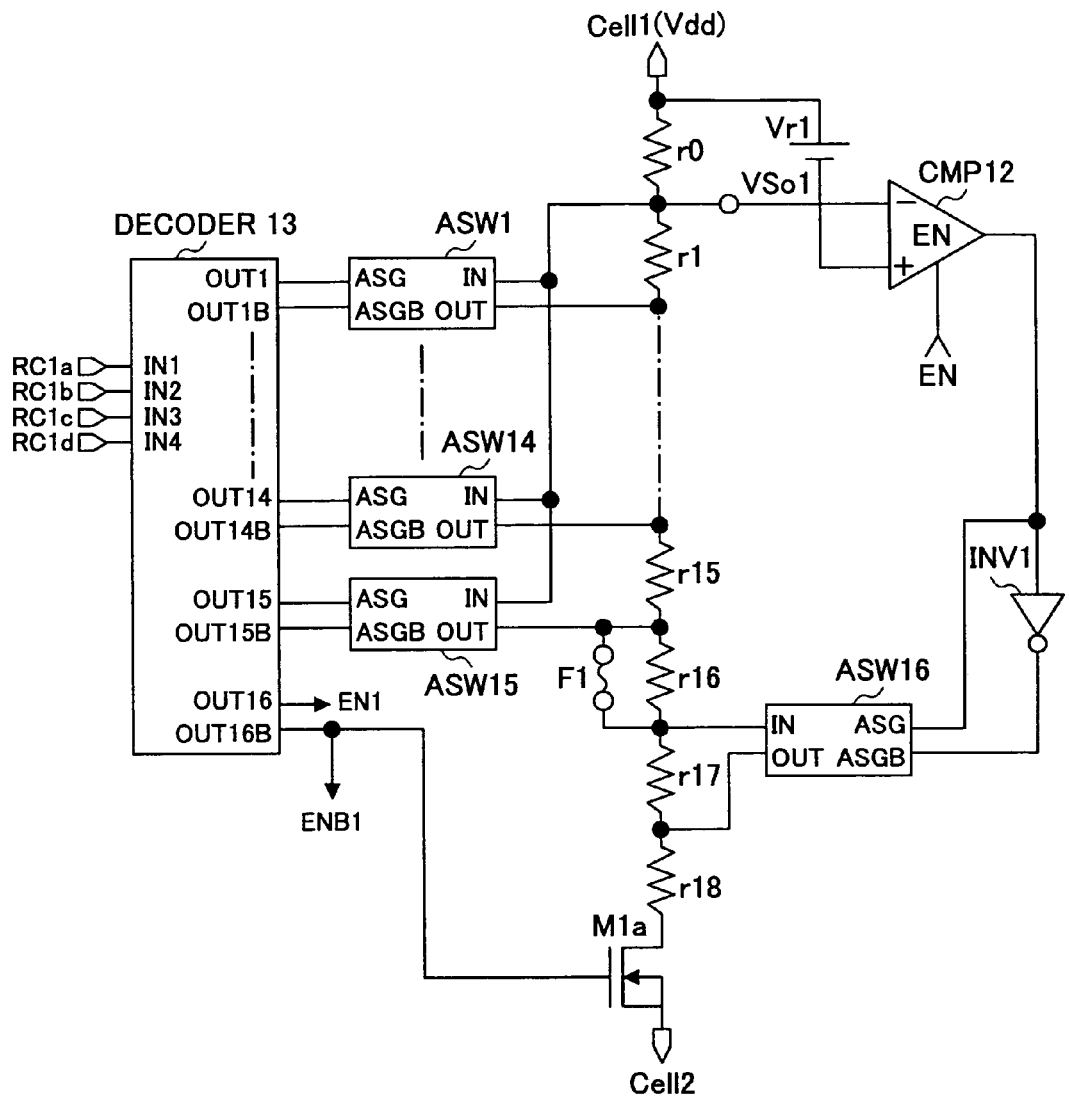
FIG. 2 is a circuit diagram illustrating in detail a structure of the voltage setting circuit VS1 shown in FIG. 1.

FIG. 2 is a circuit diagram illustrating in detail a structure of the voltage setting circuit VS1 shown in FIG. 1.

The voltage setting circuit VS1 comprises a decoder 13 for decoding 4-bit code signals RC1a~RC1d, analog switches ASW1~ASW15 turning on/off depending on outputs from the decoder 13, serially connected resistances r0~r18, an NMOS transistor M1a whose drain and source are connected between one end of the resistance r18 and a terminal Cell2, a fuse element F1 connected to the resistance r16 in parallel, an analog switch ASW16 connected to the resistance r17 in parallel, and an inverter INV1 whose output is connected to a control terminal ASGB of the analog switch ASW16.

The 4-bit code signals RC1a~RC1d sent from the control circuit are decoded by the decoder 13. The decoder 13 has 16 outputs OUT1~OUT16 and inverted outputs OUT1B~OUT16B.

FIG. 5 is a table showing relationships between the code signals RC1a~RC1d input to the decoder 13 and the outputs signals OUT1~OUT16 of the decoder 13.

Among the output terminals OUT1~OUT16, the terminal the same as the "No." at the leftmost column turns high. The outputs at the output terminals OUT4~OUT13 are omitted. The outputs at the output terminals OUT1B~OUT16B are inverted signals of the outputs at the output terminal OUT1~OUT16, and are not shown.

Figure 3:
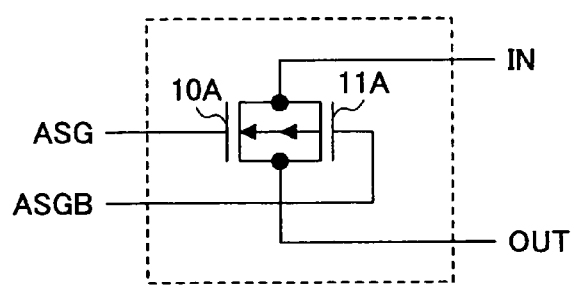
FIG. 3 is a circuit diagram of the analog switch shown in FIG. 2.
Figure 4:
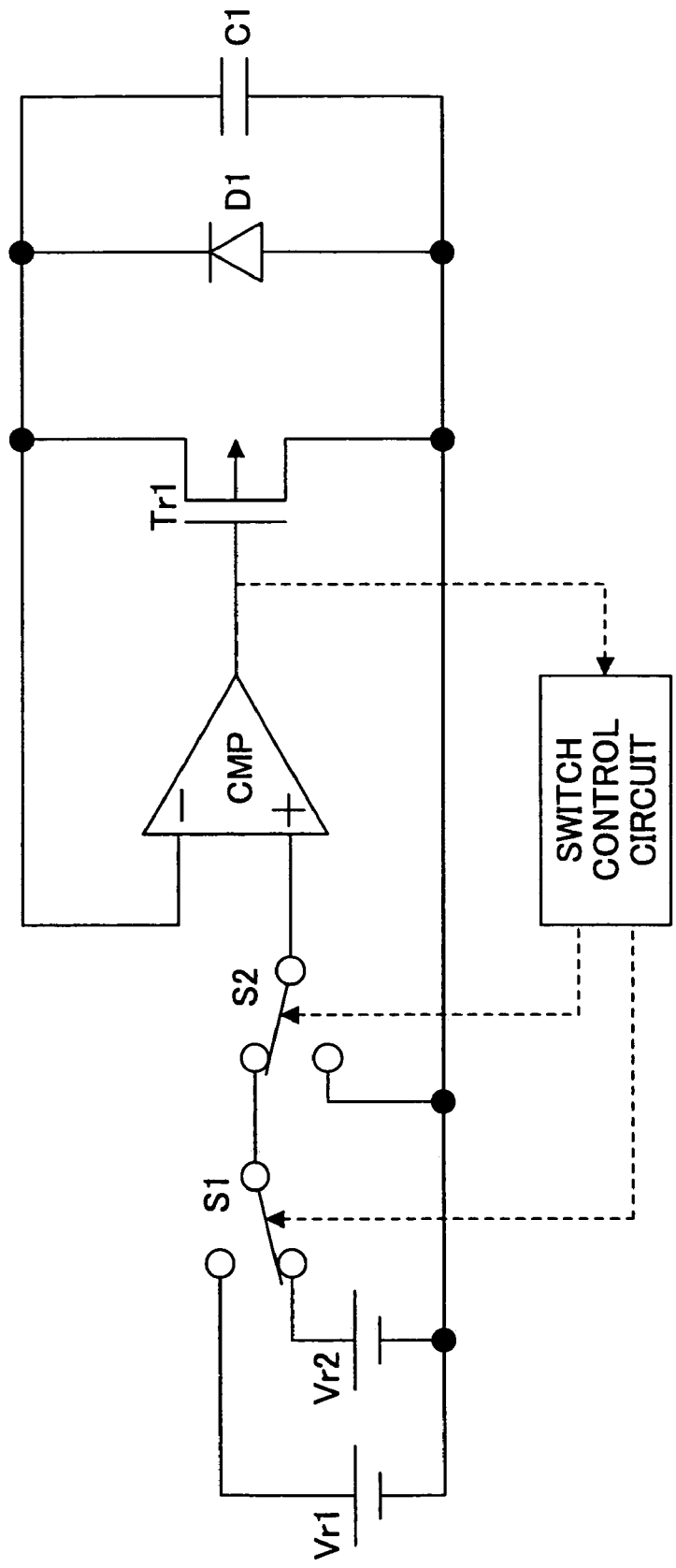
FIG. 4 is a circuit diagram of a part of a conventional parallel monitor circuit.

FIG. 3 is a circuit diagram of the analog switch shown in FIG. 2. The output terminals OUT1 and OUT1B of the decoder 13 are connected to control terminals ASG and ASGB of the analog switch ASW1, respectively. Similarly, the output terminals OUT2 and OUT2B of the decoder 13 are connected to control terminals ASG and ASGB of the analog switch ASW2, respectively. Similarly, the output terminals OUT3~OUT15 and OUT3B~OUT15B of the decoder 13 are connected to control terminals ASG and ASGB of the analog switches ASW3~ASW15, respectively.

As shown in FIG. 3, the analog switches ASW1~ASW16 may comprise an NMOS transistor 10A and a PMOS transistor 11A connected in parallel.

Input terminals IN to the analog switches ASW1~ASW15 are all connected to a node between a resistance r0 and a resistance r1. An output terminal OUT of the analog switch ASW1 is connected to a node between the resistance r1 and the resistance r2. Similarly, an output terminal OUT of the analog switch ASWn is connected to a node between the resistance rn and the resistance rn+1.

The fuse F1 is connected to the resistance r16 in parallel. Cutting the fuse F1 can change the voltage range that can be set by the voltage setting circuit VS1. In other words, one circuitry structure can provide two kinds of semiconductor apparatuses having different voltage ranges.

The ends of the resistance r17 are connected to the input IN and the output OUT of the analog switch ASW16, respectively. The control terminal ASG of the analog switch ASW16 is connected to the output of the comparator CMP12. The control terminal ASGB of the analog switch ASW16 is connected to the inverted output of the inverter INV1.

The NMOS transistor M1a is connected between one end of the resistance r18 and the terminal Cell2. A gate of the NMOS transistor M1a is connected to the output terminal OUT16B of the decoder 13. The output ENB1 of the output terminal OUT16B is for detecting a standby voltage. The NMOS transistor M1a is a kind of control unit that cuts the electric current by detecting a standby status.

The output voltage VSo1 of the voltage setting circuit VS1 is taken out from a node between the resistance r0 and the resistance r1, and connected to an inverting input of the comparator circuit CMP12.

A reference voltage Vr1 is connected between a noninverting input of the comparator circuit CMP12 and a terminal Cell1 (Vdd).

While the combination of the code signals RC1a~RC1d falls within the range of No. 1~No. 15 shown in FIG. 5, the corresponding one of the analog switches ASW1~ASW15 turns ON. At this time, since the output OUT16B of the decoder 13 is at a high level, the NMOS transistor M1a turns on and connects the serial resistances r0–r18 to the terminal Cell2. Since the other end of the resistance r0 is connected to the power supply Vdd, the output voltage VSo1 of the voltage setting circuit VS1 is a divided voltage that is equal to the power supply voltage Vdd divided by [the resistance r0 plus the sum of the resistances r1–r18], then multiplied by [the sum of the resistances r1–r18].

When the analog switch ASWn turns on, the resistances r1~rn between the input terminal IN and the output terminal OUT of the analog switch ASWn are short-circuited, and the output voltage VSo1 of the voltage setting circuit VS1 is lowered. As the value n is larger, the voltage drop across the resistance r0 increases, and lowers the monitor voltage VSo1.

Depending on the combination of the code signals RC1, any analog switch ASW can be easily turned on, and therefore the monitor voltage for bypassing the capacitor C1 can be freely and easily set.

Since the voltage between the terminal Cell1 and the terminal Cell2 is low at the initial stage of recharging the capacitor C1, the voltage drop across the resistance r0 is lower than the reference voltage Vr1, and therefore the output of the comparator circuit CMP12 is at a low level. When the recharge of the capacitor C1 proceeds and the voltage drop across the resistance r0 exceeds the reference voltage Vr1, the output of the comparator circuit CMP12 reverses to a high level. The operation thereafter is the same as the mentioned above with reference to FIG. 1.

When the control circuit determines that the each capacitor connected to the corresponding parallel monitor circuit has been fully recharged, it changes all the code signals RC1a~RC1d to high levels, and outputs the No. 16 condition shown in the combination table of FIG. 5. As a result, the output OUT16 of the decoder becomes high, and the output OUT16B becomes low, and the NMOS transistor M1a turns off, resulting in no current flowing through the serial resistances r0~r18, saving power consumption. Further, since the output OUT16 of the decoder 13 is connected to the enable terminal EN of the comparator circuit CMP12, the output OUT16 makes the comparator circuit CMP12 stop its operation and transfer to low power consumption standby mode. As shown in FIG. 1, since the output EN1 of the decoder 13 is also connected to the enable terminal EN of the comparator circuit CMP11, the comparator circuit CMP11 is transferred or shifted to a standby mode.

In this manner, the signal for transferring the parallel monitor circuits to standby status is given depending on the specific combination of voltage setting code signals RC1 for the voltage setting circuit VS1. Accordingly, a standby mode is realized without a dedicated terminal for standby mode.

Operations of the resistance r17 and the analog switch ASW16 are explained below.

When the output of the comparator CMP12 is at a low level, the analog switch ASW16 is turned off, and the resistance r17 is added to the serial resistances. On the other hand, when the output of the comparator CMP12 goes high, the analog switch ASW16 is turned on, and the resistance r17 is short-circuited. Then the output voltage VSo1 of the voltage setting circuit VS1 is lowered. The output voltage VSo1 of the voltage setting circuit VS1 is connected to the inverting input of the comparator circuit CMP12; that means the input of the comparator circuit CMP12 is given hysteresis characteristics.

As mentioned above, the analog switch ASW16 turns on to short-circuit the resistance r17. Then the output voltage VSo1 of the voltage setting circuit VS1 is lowered, to give the hysteresis characteristics to the comparator circuit CMP12. Accordingly, even while the voltage detection is not operated, the negative voltage detection can be performed and the comparator circuit CMP12 can perform abnormal detection.

Figure 7:
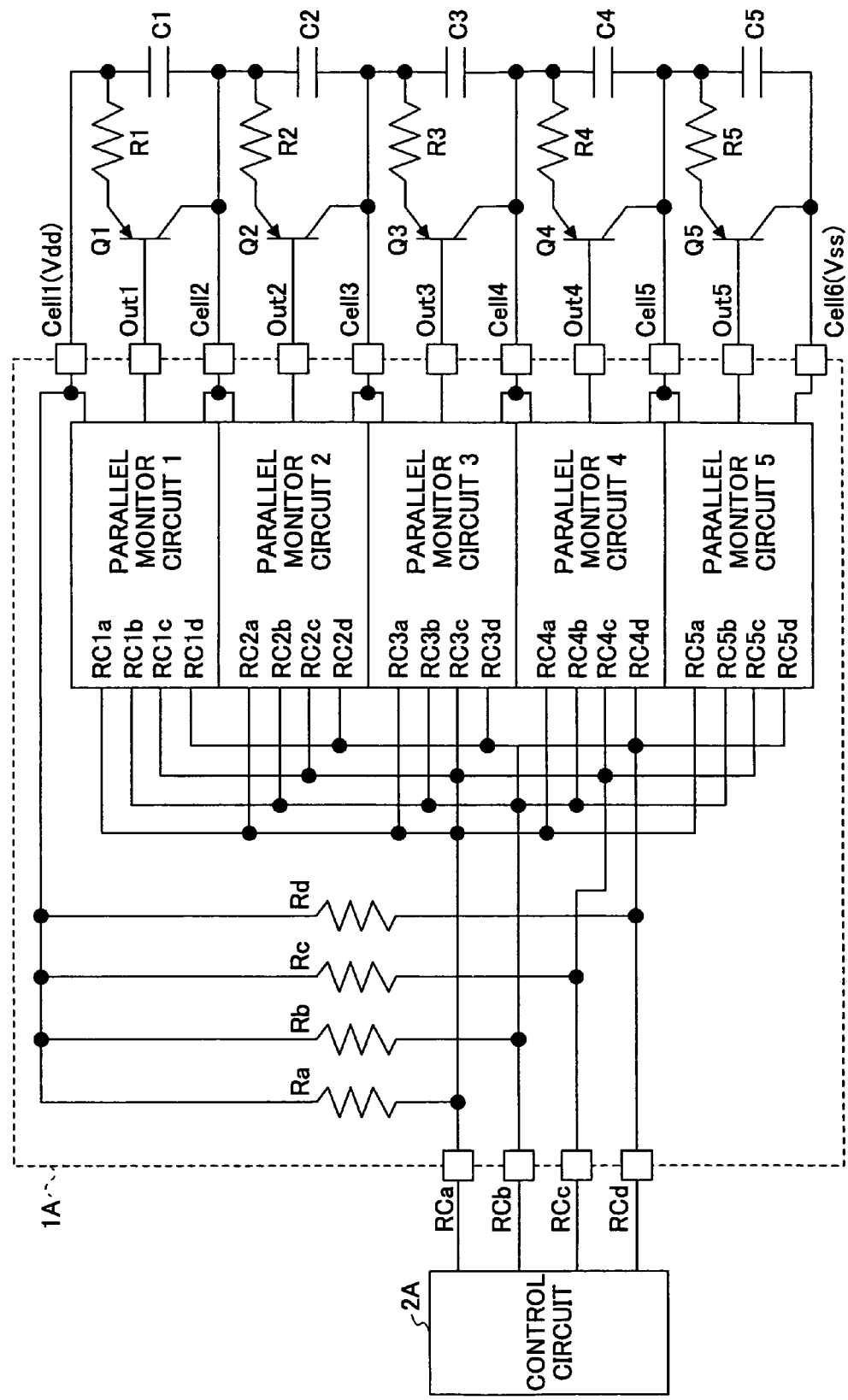
FIG. 7 illustrates connection between a control circuit and a voltage setting circuit according to an embodiment of the present invention.

As shown in FIG. 7, the code signals RC1a~RC1d are pulled up via resistances Ra, Rb, Rc and Rd, respectfully, to a power supply Vdd within the semiconductor apparatus 1A. The code signals RCa, RCb, RCc and RCd are connected to the corresponding parallel monitor circuits in the semiconductor apparatus. Therefore, if the code signal lines RCa~RCd are separated from the semiconductor apparatus 1A due to some problem, the code signals RCa~RCd become high level signals.

If the connection between the semiconductor apparatus 1A and the control circuit is separated and the code signal terminals of the semiconductor apparatus 1A become open, the parallel monitor circuits are transferred to the standby mode and abnormal recharge of the capacitors C1~Cn can be avoided.

Figure 6:
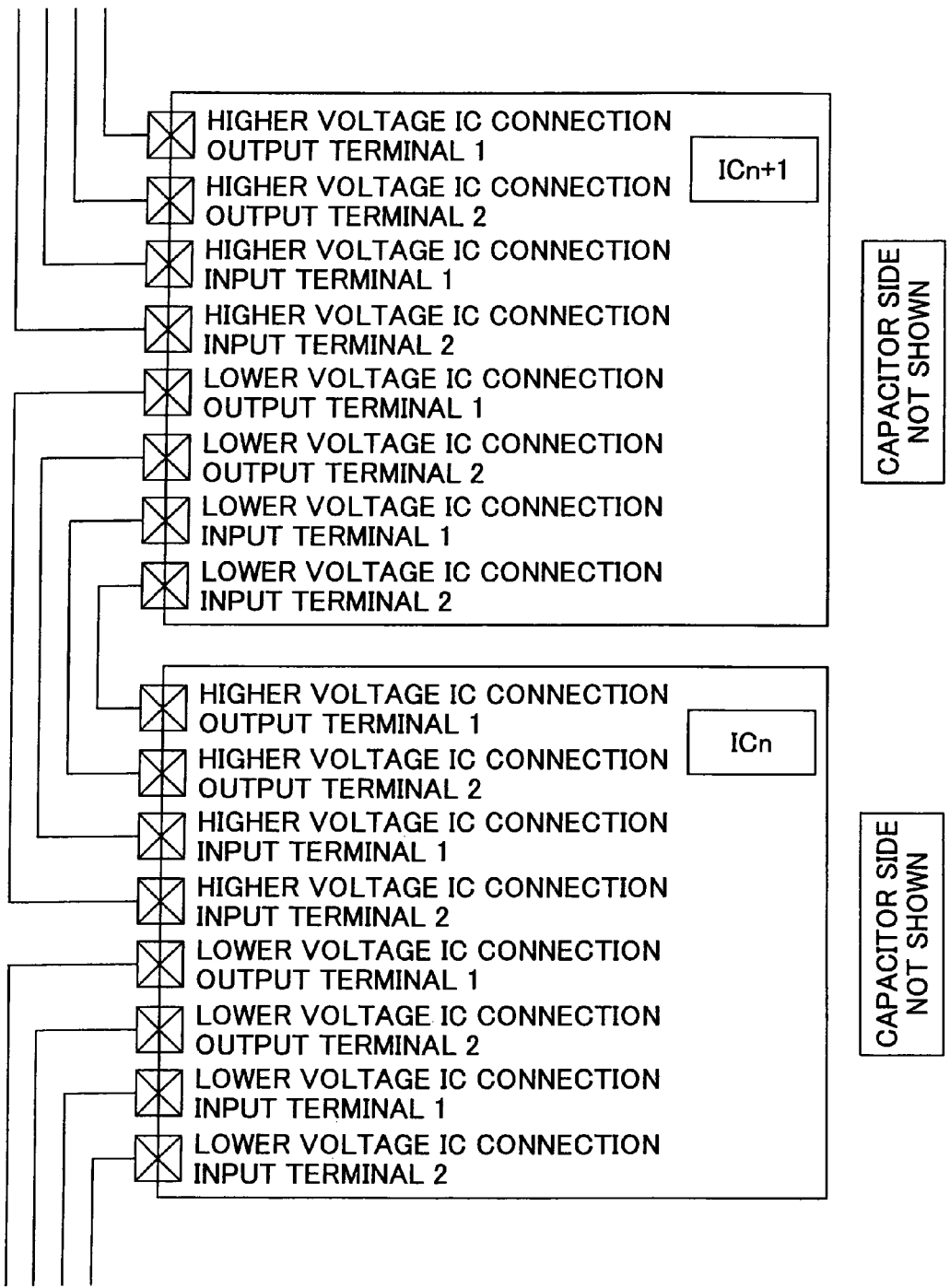
FIG. 6 illustrates connection between control terminals of plural semiconductor apparatus according to an embodiment of the present invention.

FIG. 6 illustrates connection between control terminals of plural semiconductor apparatuses according to an embodiment of the present invention.

As shown in FIG. 6, status controlling signals from a control circuit (or controlling microprocessor) are uplink signals. The status controlling signals from the control circuit are input to lower voltage IC connection terminals of an IC1 (ICn). The uplink signals input to the IC1 are signal-processed within an internal circuit, and then are output from higher voltage IC connection terminals to lower voltage IC connection terminals of an IC2 (ICn+1). Repeating this connection, the status control signals can be transmitted to an IC having the highest voltage.

Downlink signals are connected from lower voltage IC connection terminals of a higher IC to higher voltage IC connection terminals of a lower voltage IC that is lower by one. Uplink signals are connected from higher voltage IC connection terminals of a lower IC to lower voltage IC connection terminals of a higher voltage IC that is higher by one.

As shown in FIG. 6, there are four kinds of control terminals, higher voltage IC connection output terminals, higher voltage IC connection input terminals, lower voltage IC connection output terminals and lower voltage IC connection input terminals.

According to one method of the present invention, the code signals RCa~RCd are merged into the status control signal requiring no voltage setting code, and therefore the semiconductor apparatus 1A can be changed to the standby condition without adding to the number of terminals.

According to another method of the present invention, the signal lines are merged by coding the status control signals. That is, as mentioned above, the signal lines are merged by status control signals that are coded via the four kinds of terminal, a higher voltage IC connection output terminal, a higher voltage IC connection input terminal, a lower voltage IC connection output terminal, and a lower voltage IC connection input terminal, and therefore the semiconductor apparatus 1A can be changed to the standby mode without increasing the number of terminals.

Conventionally, each of the serially connected ICs is controlled from the lowest IC to the highest IC one by one, and one signal needs two terminals for status controlling, thereby increasing the manufacturing cost.

In order to avoid the increase of the terminals, the present invention can employ at least two methods. One is that code signals and status control signals requiring no voltage code are merged. Such status control signals can be obtained from specific compbinations of the code signal. The other one is that the status code signals are coded and the signal lines are merged. The signal lines to corresponding terminals of plural parallel monitor circuits are connected together.

In this manner, no special terminal or wiring is required for shifting the parallel monitor circuits to a standby mode. Therefore, a package having few terminals can be used to reduce the manufacturing cost.

The present invention is not limited to these embodiments, but variations and modifications may be made without departing from the scope of the present invention.

The present application is based on Japanese Priority Application No. 2004-098755 filed on Mar. 30, 2004 with the Japanese Patent Office, the entire contents of which are hereby incorporated by reference.

What is claimed is:

1. A parallel monitor circuit for monitoring one of a plurality of serially connected capacitors receiving a direct recharging current, comprising:
   voltage code terminals for receiving voltage codes from the outside;
   a bypassing transistor for bypassing the one capacitor with the recharging current when a partial voltage of the one capacitor exceeds a monitor voltage determined by a voltage setting circuit in order to equally recharge the capacitors, a partial ratio of the partial voltage of the one capacitor being determined by a combination of the voltage codes; and
   a transferring unit for transferring a voltage control circuit and an internal circuit connected to the voltage control circuit to a standby mode when the voltage control circuit receives a specific combination of voltage codes.

2. The parallel monitor circuit as claimed in claim 1, wherein a standby signal is output when all the bits of the voltage codes are high.

3. The parallel monitor circuit as claimed in claim 1, wherein a negative voltage is detected and abnormal operation is detected after the internal circuit has been transferred to the standby mode and voltage detection has been stopped.

4. The parallel monitor circuit as claimed in claim 1, wherein the voltage codes input to the voltage control circuit can be used for giving status control signals requiring no voltage setting code, using control terminals for connecting plural semiconductor apparatuses, without adding a dedicated terminal.

5. The parallel monitor circuit as claimed in claim 1, wherein signal lines and control terminals are used for connecting a plurality of semiconductor apparatuses, without adding a dedicated terminal.

6. A semiconductor apparatus having a plurality of the parallel monitor circuits as claimed in claim 1.

7. The parallel monitor circuit as claimed in claim 1, wherein a standby signal is output when no voltage code is received.

* * * * *